(12) United States Patent
Lin

(10) Patent No.: US 9,477,077 B2
(45) Date of Patent: Oct. 25, 2016

(54) PROJECTION DEVICE WITH COLOR WHEEL LOCKING FUNCTION AND METHOD USING THE SAME

(71) Applicant: BenQ Corporation, Taipei (TW)

(72) Inventor: Chi-Cheng Lin, Taoyuan (TW)

(73) Assignee: BenQ Corporation, Taipei (TW)

(*) Notice: Subject to any disclaimer, the term of this patent is extended or adjusted under 35 U.S.C. 154(b) by 0 days.

(21) Appl. No.: 14/689,251

(22) Filed: Apr. 17, 2015

(65) Prior Publication Data

US 2015/0301331 A1    Oct. 22, 2015

(30) Foreign Application Priority Data

Apr. 22, 2014    (TW) .............................. 103114505 A

(51) Int. Cl.
| | | |
|---|---|---|
| G02B 26/00 | (2006.01) | |
| G03B 21/20 | (2006.01) | |
| G03B 21/14 | (2006.01) | |
| G03B 21/00 | (2006.01) | |
| G03B 33/08 | (2006.01) | |

(52) U.S. Cl.
CPC ........... *G02B 26/008* (2013.01); *G03B 21/145* (2013.01); *G03B 21/206* (2013.01); *G03B 21/008* (2013.01); *G03B 33/08* (2013.01)

(58) Field of Classification Search
CPC    G03B 21/14; G03B 21/145; G03B 21/2053; H04N 13/0438; H04N 13/0497; H04N 13/0459
See application file for complete search history.

(56) References Cited

U.S. PATENT DOCUMENTS

| | | | |
|---|---|---|---|
| 7,348,754 B2* | 3/2008 | Prasanna | H02K 49/046 310/156.03 |
| 2007/0139618 A1* | 6/2007 | DeCusatis | G03B 21/14 353/7 |

* cited by examiner

*Primary Examiner* — Sultan Chowdhury

(57) ABSTRACT

A projection device with a color wheel locking function is provided. The projection device includes a light source, a first color wheel unit, a first spindle motor, a magnetic locking mechanism and a control unit. The light source generates a light beam. The first color wheel unit has at least one transparent region through which the light beam transmits. The first spindle motor is to be enabled to rotate the first color wheel unit, and disabled to stop rotating in correspondence with an external magnetic force. The magnetic locking mechanism abuts upon the first spindle motor and generates the external magnetic force. The control unit controls the magnetic locking mechanism. When the first spindle motor stops in correspondence with the external magnetic force, a position of the at least one transparent region corresponds to the light source so that the light beam transmits through the transparent region.

20 Claims, 7 Drawing Sheets

PROJECTION DEVICE WITH COLOR WHEEL LOCKING FUNCTION AND METHOD USING THE SAME

This application claims the benefit of Taiwan application Serial No. 103114505, filed Apr. 22, 2014, the subject matter of which is incorporated herein by reference.

BACKGROUND OF THE INVENTION

1. Field of the Invention

The invention relates in general to a projection device with a color wheel locking function and a method using the same, and more particularly to a device and a method thereof, in which an external magnetic force is provided to lock a spindle motor therein so that a color wheel is locked at a specified position.

2. Description of the Related Art

Most people have the experience of using projectors in conducting either the presentations, conferences or speeches in the occasions of company and seminars, or the video playback in the general family. The applications in conjunction with projectors can provide the viewer excellent presentation and visual effects by way of large-screen projection display.

Generally speaking, the projector uses a color wheel to process a white light beam, generated by a light source and illuminated thereon, into corresponding color light beams for projection. The color wheel is a disk rotatable at a high speed, and has light filtering regions of different colors, wherein the colors usually include red, green and blue colors. That is, the three primary colors of RGB are arranged on the color wheel. By controlling the rotational speed of the disk, different color light beams can be rapidly and continuously emitted. In addition, multiple colors of an image can be generated and presented according to the persistence of vision phenomenon of the human eye.

In addition, to emphasize different applications and projection effects of the projector, different color arrangements on the color wheels may be designed. For example, in the application where the luminance is particularly emphasized, a white or transparent region can be added to the color wheel, so that the light beam illuminating the white or transparent region projects as a color-free light beam. Alternatively, the color wheel is directly designed to have a notch, so that most of the light beams of the light source can transmit through the notch, and the better effects on the presentation of the luminance of the image are obtained.

Alternatively, another color or other colors other than the three primary colors can be added in order to achieve a special color projection effect. However, no matter which application is required, the sizes and the ratios of the regions occupied by various colors are adjusted according to the divided graduations on the disk so as to adjust illuminated time periods of different colors and thus to change the feeling of the human eyes seeing the color of the projected image.

Therefore, in order to achieve the functions of emphasizing the image luminance and color property, the prior art is to dispose two color wheels inside the projector. That is, one color wheel has a notched transparent region, and the other color wheel is an integral disk composed of non-transparent regions.

FIG. 1A is a schematic view showing an inner structure of a conventional projector 100 having two color wheels. As shown in the drawing, original positions of a first color wheel 12 and a second color wheel 14 partially overlap with each other on an optical path 101 of a light beam generated by a light source 10. The two color wheels 12 and 14 can be rotated by the spindle motors 11 and 13, respectively, and the generated light beam can be reflected at various angles through a data plane 15 (may be a reflective DMD) to project the image been seen. The overlapping of the two color wheels 12 and 14 is depicted in FIG. 1B.

As mentioned hereinabove, one of the color wheels needs to have a mechanical moving function in the projector with two color wheels. As shown in FIGS. 1A and 1B, the first color wheel 12 has a transparent region 120. When the second color wheel 14 needs to operate, the first color wheel 12 is rotated so that its transparent region 120 is disposed on the optical path 101, and the light beam of the light source 10 can illuminate the second color wheel 14 and transmit through the transparent region 120 without being affected. The second color wheel 14 is designed to have the relative moving structure. When the first color wheel 12 needs to operate, the second color wheel 14 can be moved away from the optical path 101 to avoid interfering with the illuminating light beam.

In other words, if the two color wheels are designed to be movable, then the interference between the two color wheels can be effectively avoided. However, such a design inevitably increases the manufacturing cost and the overall size of the device. Thus, it is an important development direction of such the projector to ensure that each color wheel can be moved to or locked at the correct position under the precondition that only one color wheel is movable.

SUMMARY OF THE INVENTION

The invention is directed to a projection device with a color wheel locking function and a method using the same. In the projection device, an external magnetic force is applied to lock a spindle motor therein, so that its corresponding color wheel is locked at a specified position, thereby effectively avoiding the two color wheels from interfering with each other.

According to a first aspect of the present invention, a projection device with a color wheel locking function is provided. The projection device comprises a light source, a first color wheel unit, a first spindle motor, a magnetic locking mechanism and a control unit. The light source generates a light beam. The first color wheel unit has at least one transparent region through which the light beam transmits. The first spindle motor is to be enabled to rotate the first color wheel unit, and disabled to stop rotating in correspondence with an external magnetic force. The magnetic locking mechanism abuts upon the first spindle motor and generates the external magnetic force. The control unit controls the magnetic locking mechanism. When the first spindle motor stops in correspondence with the external magnetic force, a position of the at least one transparent region corresponds to the light source so that the light beam transmits through the transparent region.

According to a second aspect of the present invention, a color wheel locking method applied to a projection device is provided. The projection device comprises a light source, a first color wheel unit, a first spindle motor, a magnetic locking mechanism and a control unit. The method comprises the steps of: enabling the first spindle motor to rotate the first color wheel unit; disabling the first spindle motor; and enabling the control unit to control the magnetic locking mechanism abutting upon the first spindle motor, so that the first spindle motor stops in correspondence with an external magnetic force generated by the magnetic locking mechanism. When the first spindle motor stops in correspondence with the external magnetic force, a position of a transparent region of the first color wheel unit corresponds to the light source, so that a light beam generated by the light source transmits through the transparent region.

The above and other aspects of the invention will become better understood with regard to the following detailed description of the preferred but non-limiting embodiment(s). The following description is made with reference to the accompanying drawings.

DETAILED DESCRIPTION OF THE INVENTION

The embodiments will be described in detail in the following, wherein the embodiments are given for the illustrative purpose only without restricting the claim of the invention. In addition, nonessential elements are omitted from the drawings showing the embodiments so that the technical characteristics of the invention can be clearly described.

Figure 1A:
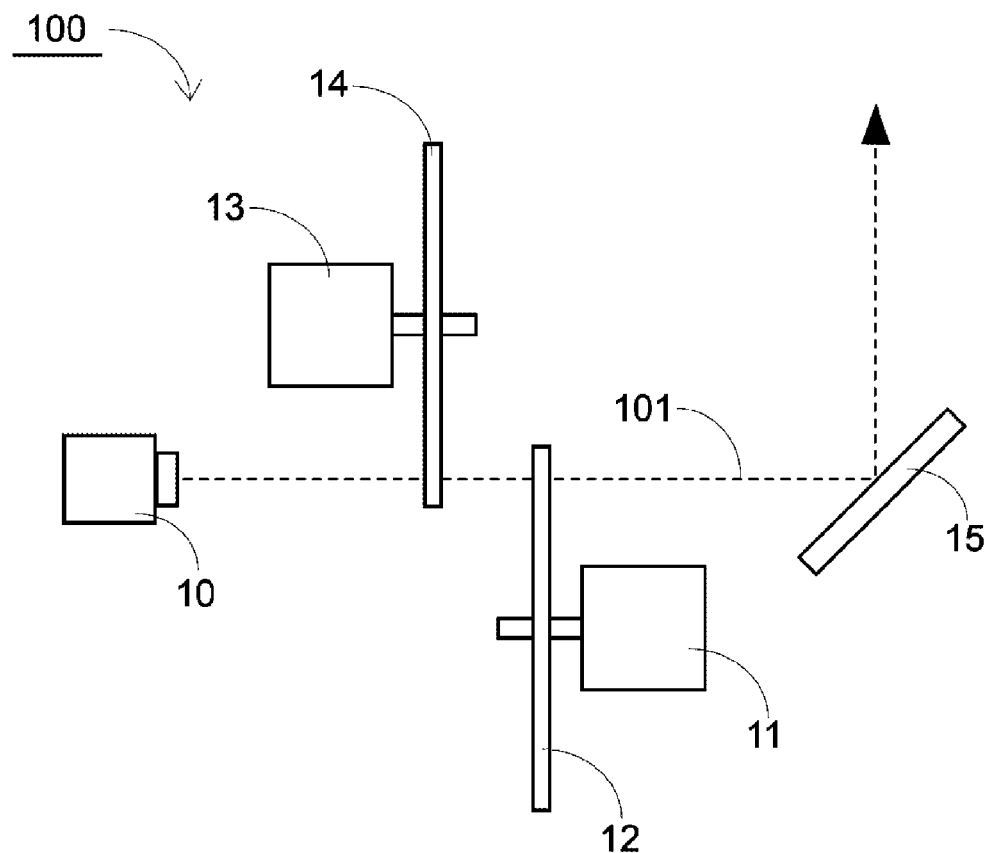
FIG. 1A is a schematic view showing an inner structure of a conventional projector 100 having two color wheels.
Figure 1B:
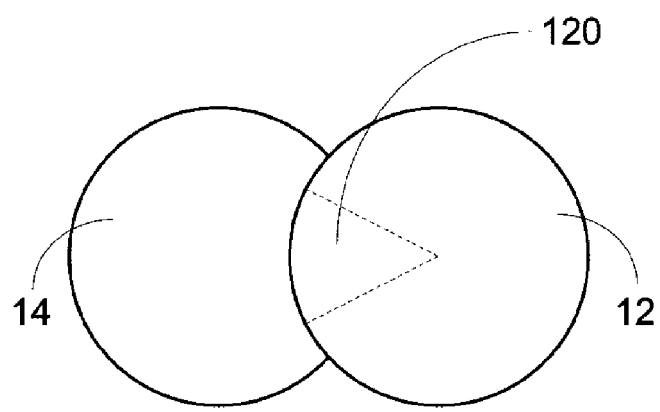
FIG. 1B is a schematic view showing that the two color wheels 12 and 14 overlap with each other.
Figure 2:
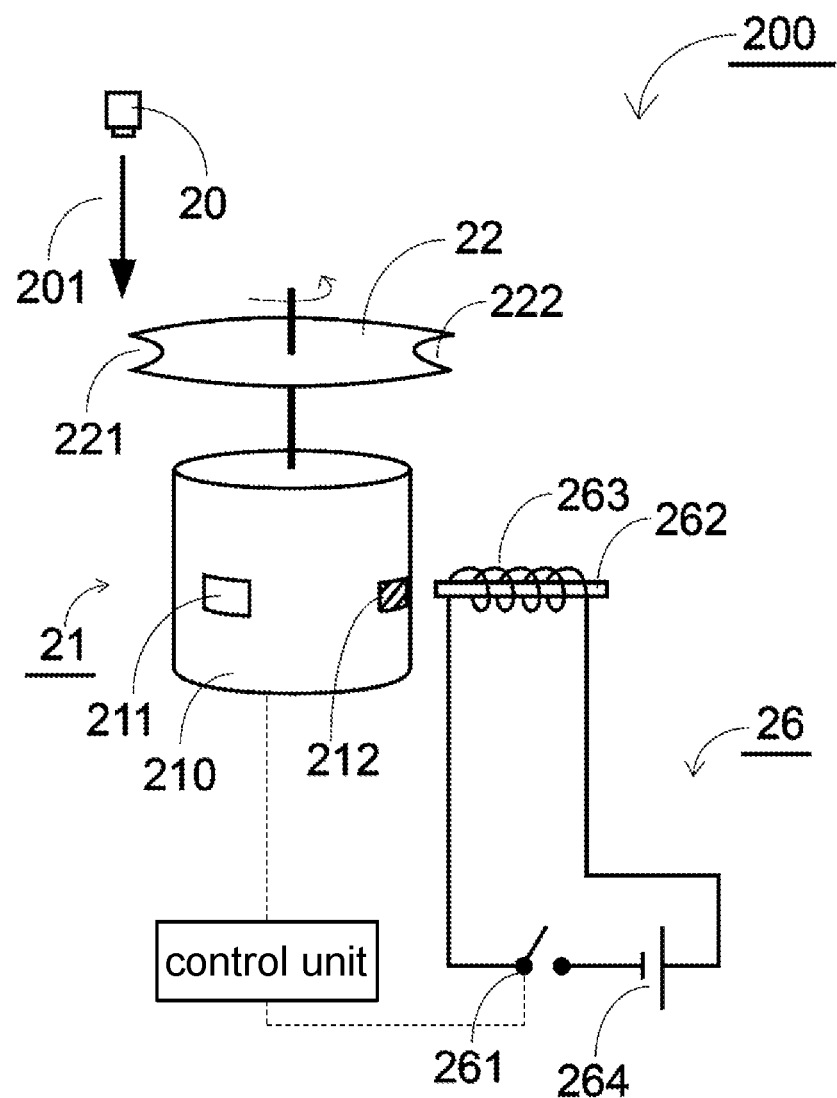
FIG. 2 is a schematic view showing an inner structure of a projection device 200 with a color wheel locking function according to the invention.

The implementation of the invention will be described in the following according to a first embodiment. FIG. 2 is a schematic view showing an inner structure of a projection device 200 with a color wheel locking function according to the invention. Referring to FIG. 2, the projection device 200 comprises a light source 20, a first color wheel unit 22, a first spindle motor 21 and a magnetic locking mechanism 26. The light source 20 generates a light beam 201 of white light, for example, and the first color wheel unit 22 has at least one transparent region. In this embodiment, the first color wheel unit 22 is configured to have two transparent regions 221 and 222, which have design of notches. Of course, the first color wheel unit 22 may also be configured into an integral disk and the specified transparent regions are configured as transparent in another embodiment.

In this embodiment, the transparent notches 221 and 222 are configured such that when the transparent notch 221 or 222 is rotated to a position to align with the light source 20, the light beam 201 can transmit through the transparent notch 221 or 222 correspondingly. Furthermore, the transparent regions 221 and 222 are designed in the form of notches, so the positions of the two transparent regions 221 and 222 are 180-degree symmetrical in order to balance the rotation of the first color wheel unit 22. That is, the connection line between the two transparent regions 221 and 222 passes through the center of the first color wheel unit 22.

On the other hand, the first color wheel unit 22 and the first spindle motor 21 in this embodiment cannot move relatively to the light source 20, and a fixed relative position is present between the magnetic locking mechanism 26 and the first spindle motor 21. The projection device 200 with the color wheel locking function according to the invention has two color wheels, so the other color wheel unit (not shown in FIG. 2) needs to have a moving mechanism. The position and the moving mechanism of the second color wheel unit may be the same as those of the prior art, and detailed descriptions thereof will be omitted.

As mentioned hereinabove, the first spindle motor 21 can be enabled (started) to rotate the first color wheel unit 22. The first spindle motor 21 includes a casing 210, an indication mark 211 and a lock magnet unit 212, wherein the indication mark 211 and the lock magnet unit 212 are disposed on the casing 210.

The indication mark 211 is a position and speed feedback mark (PSM) capable of indicating the transparent regions 221 and 222 by way of signal transmission. This is because the indication mark 211 is also rotated with the rotation of the first spindle motor 21. Fixed relative positions are present between the indication mark 211 and the transparent regions 221 and 222. That is, the distances therebetween are fixed to correctly indicate the positions of the transparent regions 221 and 222. The arrangement of the indication mark 211 pertains to the prior art, and will not be described herein.

One characteristic of the invention resides in that the rotation of the first spindle motor 21 can be stopped in response to an external magnetic force upon being disabled (stopped), and more particularly resides in a mechanism capable of slowing down the rotation and finally completely stopping and locking the motor at a specified position in this embodiment. The external magnetic force is generated by the magnetic locking mechanism 26 abutting upon the first spindle motor 21. In this embodiment, the magnetic locking mechanism 26 generates the external magnetic force by an electronic magnet. Referring to FIG. 2, the magnetic locking mechanism 26 may comprise a switch 261, a core 262, a coil 263 and a DC power 264. When the switch 261 is turned on, one end of the core 262 can generate the magnetic field.

Next, the lock magnet unit 212 disposed on the casing 210 is disposed with a magnetic pole, capable of being attracted by the external magnetic force, facing outwards. For example, when the magnetic field generated by one end of the core 262 is S pole, the lock magnet unit 212 is disposed with N pole facing outwards so that the core 262 and the lock magnet unit 212 can be attracted together. In detail, when the first spindle motor 21 is rotating, the lock magnet unit 212 is also rotating therewith, and the position of the magnetic locking mechanism 26 corresponds to the lock magnet unit 212. In this embodiment, one end of the core 262 is correspondingly disposed to abut upon the rotation track of the lock magnet unit 212, and a gap capable of effectively generating the magnetic field is present between the core 262 and the lock magnet unit 212.

Similar to the arrangement of the indication mark 211, fixed relative positions are also present between the lock magnet unit 212 and the transparent regions 221 and 222.

That is, the distances therebetween are not changed. In detail, this embodiment is configured such that when one transparent region (the transparent region 221 in FIG. 2) is aligned with the light source 20, the lock magnet unit 212 is aligned with the core 262 of the magnetic locking mechanism 26.

According to the above-mentioned description, it is obtained that another characteristic of this embodiment resides in that the timing of controlling the magnetic locking mechanism 26 to generate the external magnetic force falls on the timing when the first spindle motor 21 is disabled (i.e., stopped); and that when the first spindle motor 21 is enabled (i.e., started) to rotate, the magnetic locking mechanism 26 does not generate the external magnetic force. Thus, the projection device 200 further comprises a control unit, which is electrically connected to the first spindle motor 21 (or the indication mark 211) and the magnetic locking mechanism 26, and controls the magnetic locking mechanism 26 (i.e., controls the switch 261 to turn on or off) according to the enabled/disabled state of the first spindle motor 21.

In other words, the control unit controls the magnetic locking mechanism 26 to generate the external magnetic force in response to the disabled state of the first spindle motor 21. Because the first spindle motor 21 is switched from the operating state to the non-operating state when the first spindle motor 21 is still rotating, when the first spindle motor 21 is disabled, it still has a moment of inertia and thus can continue rotating a plurality of number of turns. Thus, the lock magnet unit 212 can pass through the front of the core 262 of the magnetic locking mechanism 26 more than once. That is, when the switch 261 is turned on, the lock magnet unit 212 will lower down the overall rotating speed in correspondence with the continuous attraction of the external magnetic force. When its rotating speed is lowered down to a specific value, the lock magnet unit 212 can not escape form the external magnetic force and thus stops.

When the first spindle motor 21 stops in correspondence with the external magnetic force, the lock magnet unit 212 is aligned with the core 262 of the magnetic locking mechanism 26, thereby achieving the locking at the specified position. With the design of the relative position, the position of one transparent region 221 corresponds to the light source 20, so that the light beam 201 can transmit therethrough. Furthermore, when the first spindle motor 21 is again enabled and switched to the rotating state, the magnetic locking mechanism 26 stops generating the external magnetic force.

The above-mentioned embodiment is described with reference to the locking of the first spindle motor 21 under the rotating condition of the normal operation. However, when the first spindle motor 21 of the projection device 200 is in the non-operating state, the transparent region 221 (or 222) may not be aligned with the light source 20. For example, when the projection device 200 is just turned on and does not perform the above-mentioned process, or the external magnetic force has stopped, so that the transparent regions 221 and 222 on the first color wheel unit 22 may be offset, and the light beam 201 is blocked and cannot transmit therethrough.

Accordingly, this embodiment further has another mechanism, in which when the first spindle motor 21 stops, and the position of one transparent region 221 (or 222) does not correspond thereto or uncertainly corresponds thereto (e.g., stopped and then started), the first spindle motor 21 is enabled to rotate at a predetermined rotating speed first to make the first spindle motor 21 enter the rotating state. This predetermined rotating speed may be the relative low rotating speed, which is different from the rotating speed generated by the first spindle motor 21 enabled when the first color wheel unit 22 is in the normal operation. Then, the first spindle motor 21 is again disabled, so that the magnetic locking mechanism 26 can lock the lock magnet unit 212 at the specified position as mentioned hereinabove, to make the position of the transparent region 221 correspond to the light source 20.

Figure 3:
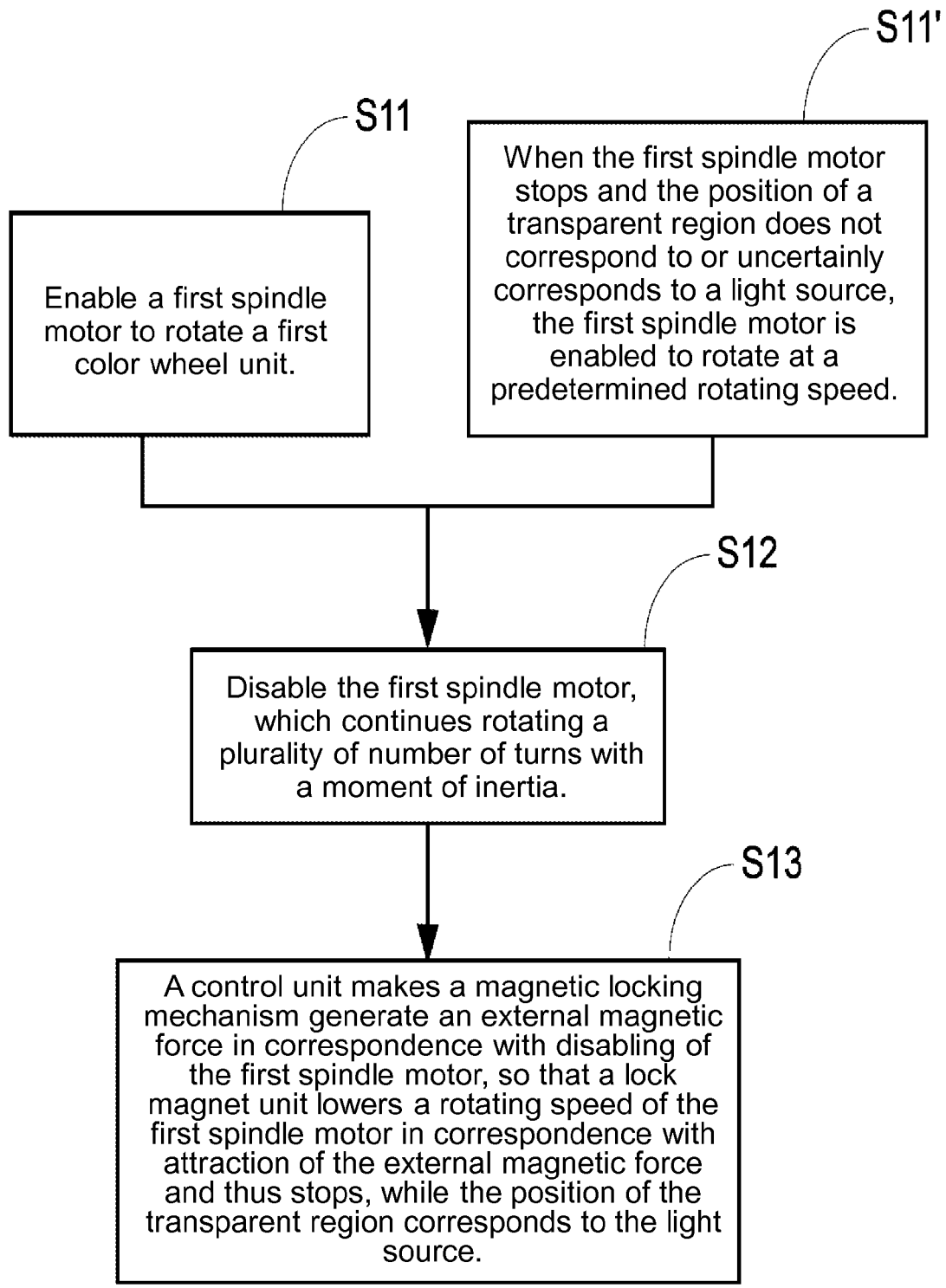
FIG. 3 is an implementation flow chart showing a color wheel locking method according to a first embodiment of the invention.

FIG. 3 is an implementation flow chart showing a color wheel locking method applied to the projection device 200 according to the first embodiment of the invention. First, the first spindle motor 21 is enabled to rotate the first color wheel unit 22 (step S11). Next, the first spindle motor 21 is disabled, and the first spindle motor 21 continues rotating a plurality of number of turns by the moment of inertia (step S12). Then, the control unit makes the magnetic locking mechanism 26 generate the external magnetic force in correspondence with the disabling of the first spindle motor 21, so that the lock magnet unit 212 lowers the rotating speed in correspondence with the attraction of the external magnetic force, and thus stops, while the position of one transparent region 221 corresponds to the light source 20 (step S13).

As mentioned hereinabove, the first embodiment may also start from another step. That is, when the first spindle motor 21 stops and the position of its transparent region does not correspond to or uncertainly corresponds to the light source 20, the first spindle motor 21 is enabled to rotate at a predetermined rotating speed (step S11'). The subsequent implementation flow can similarly enter the steps S12 to S13.

The invention may further be correspondingly modified according to the concepts disclosed in the first embodiment, so that the similar effects and implementations can be achieved under the similar structure design.

Figure 4:
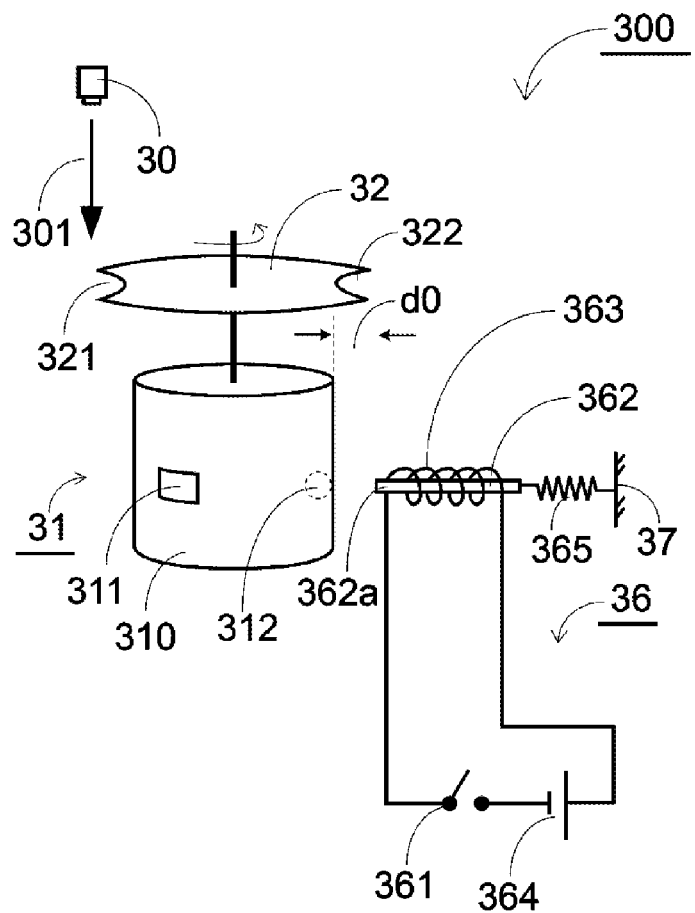
FIG. 4 is a schematic view showing an inner structure of a projection device 300 with a color wheel locking function according to the invention.

A second embodiment of the invention will be described in the following. FIG. 4 is a schematic view showing an inner structure of a projection device 300 with a color wheel locking function according to the invention, wherein the similar references relate to the similar elements. As shown in FIG. 4, the difference of this embodiment resides in that a lock magnet unit is not disposed on the first spindle motor 31. Instead, a casing 310 made of a metallic or paramagnetic material is provided, and a locking point 312 thereon is set and to be attracted by the external magnetic force.

Although the lock magnet unit 212 in the first embodiment has the more significant effect of being attracted by the magnetic force as compared with the ambient casing 210, it still has a predetermined weight to affect the overall balance and cause the damage upon the rotation of the color wheel. Thus, the cost is increased to add the symmetrical balancing counterbalance. The main characteristic of the second embodiment is to directly adopt the casing 310 as an object to be attracted; and more particularly is to provide a mechanism capable of immediately stopping the rotation of the first spindle motor 31 once a magnetic locking mechanism 36 generates an external magnetic force, and capable of locking the locking point 312 at the specified position.

Similarly, the fixed relative positions are also present between the indication mark 311, the locking point 312 and the transparent regions 321 and 322, and the first color wheel unit 32 and the first spindle motor 31 also cannot be moved relatively to the light source 30. However, as shown in FIG. 4, the core 362 of the magnetic locking mechanism 36 is movable relatively to the first spindle motor 31. It can be obtained that another characteristic of this embodiment also resides in the timing of controlling the magnetic locking mechanism 36 to generate the external magnetic force, but the generating timing does not fall on the timing when the first spindle motor 31 is disabled.

Figure 5:
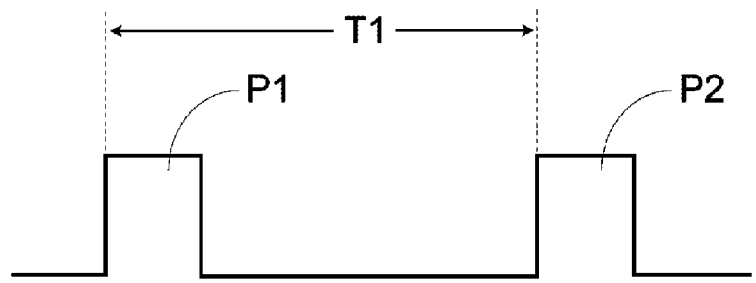
FIG. 5 shows a diagram of the time versus the signal transmitted by an indication mark 311.

FIG. 5 shows a diagram of the time versus the signal transmitted by the indication mark 311. As shown in FIG. 5, a time length between a first signal P1 and a second signal P2 represents the rotation period T1 when the first spindle motor 31 rotates one turn. That is, a signal is outputted when the indication mark 311 rotates one turn. In this embodiment, the first spindle motor 31 being still rotating is similarly switched from the operating state to the non-operating state. Thus, the first spindle motor 31 still has a moment of inertia when being disabled, and thus can continue rotating a plurality of number of turns. Under the moment of inertia, the subsequent rotation will slow down gradually, the period is lengthened, and the lengthening trend can be calculated.

In addition, the indication mark 311 can indicate the relative position of the locking point 312 (similar to the lock magnet unit 212 of the first embodiment), so the locking point 312 or the displacement trend of an arbitrary point on the first spindle motor 31 can be obtained by way of calculation. Thus, the control unit of this embodiment makes the indication mark 311 detect at least one rotation period of the locking point 312 in correspondence with the disabling of the first spindle motor 31. It is preferred to detect multiple rotation periods and compare the front and rear periods with each other to obtain its changing trend.

Next, the control unit calculates a predetermined time when the locking point 312 reaching a predetermined rotating speed rotates to a predetermined position according to the obtained rotation period. In detail, the predetermined position is disposed in front of the core 362 of the magnetic locking mechanism 36; and the predetermined rotating speed is a relative low rotating speed, which is different from the rotating speed generated by the first spindle motor 31 enabled when the first color wheel unit 32 is in the normal operation. The predetermined rotating speed (may be equal to or approximate to the predetermined rotating speed in the step S11' of the previous example) is mainly determined according to the magnitude of the external magnetic force, which can be generated by the magnetic locking mechanism 36 to ensure that the first spindle motor 31 can be immediately stopped upon the generation of the external magnetic force.

Thereafter, the control unit makes the magnetic locking mechanism 36 generate the external magnetic force at the predetermined time, so that the set locking point 312 can be correctly attracted. The locking point 312 is attached to the core 362 of the magnetic locking mechanism 36 in correspondence with the attraction of the external magnetic force, and thus stops.

On the other hand, the magnetic locking mechanism 36 further comprises a spring 365, which has one end disposed on the core 362, and the other end disposed on a fixing surface 37. In this embodiment, a gap d0 is present between the core 362 and the locking point 312 before the external magnetic force is generated. After the external magnetic force is generated, attracting condition of the core 362 to the locking point 312 moves the core 362 so that one end 362a thereof is attached to the locking point 312.

As mentioned hereinabove, in correspondence with the rotating speed (may be the predetermined rotating speed) of the locking point 312 or the magnitude of the external magnetic force, the displacement of the core 362 may be larger than or equal to the gap d0. Furthermore, the property of the spring 365 can generate the resilient deformation in correspondence with the displacement of the core 362, and pulls the locking point 312 and the core 362 back to the specified positions. Thus, when the locking point 312 is locked at the specified position, the position of the transparent region 321 corresponds to the light source 30.

Figure 6:
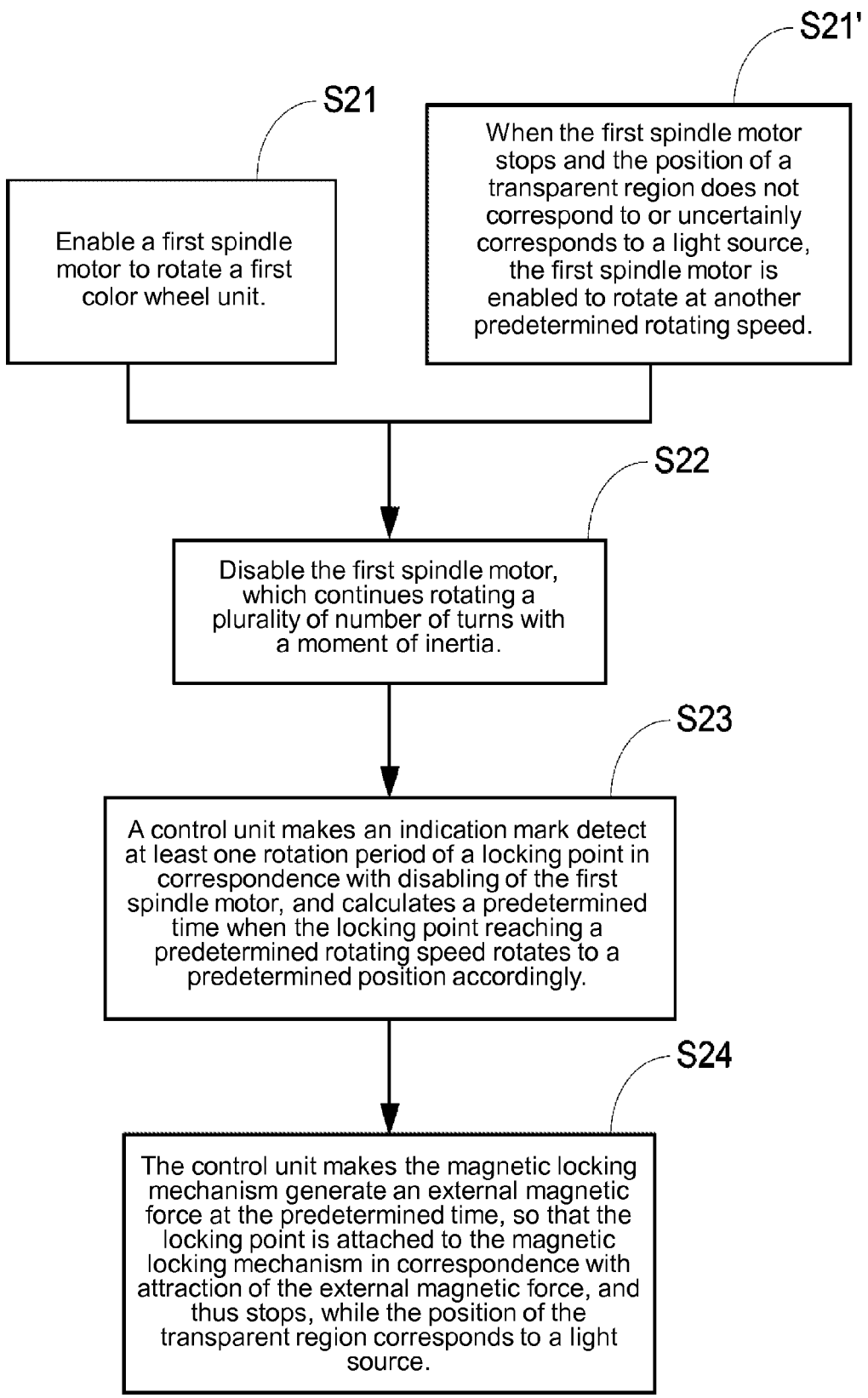
FIG. 6 is an implementation flow chart showing a color wheel locking method according to a second embodiment of the invention.

FIG. 6 is an implementation flow chart showing a color wheel locking method applied to the projection device 300 according to a second embodiment of the invention. First, the first spindle motor 31 is enabled to rotate the first color wheel unit 32 (step S21). Next, the first spindle motor 31 is disable, and the first spindle motor 31 continues rotating a plurality of number of turns by the moment of inertia (step S22). Then, the control unit makes the indication mark 311 detect at least one rotation period of the locking point 312 in correspondence with the disabling of the first spindle motor 31, and calculates a predetermined time when the locking point 312 reaching a predetermined rotating speed rotates to a predetermined position (step S23) according to the at least one rotation period. Thereafter, the control unit makes the magnetic locking mechanism 36 generate the external magnetic force at the predetermined time, so that the locking point 312 is attached to the magnetic locking mechanism 36 in correspondence with the attraction of the external magnetic force, and thus stops. Meanwhile, a position of the transparent region 321 corresponds to the light source 30 (step S24).

Similarly, the second embodiment may also start from another step. That is, when the first spindle motor 31 stops and the position of its transparent region does not correspond to or uncertainly corresponds to the light source 30, the first spindle motor 31 is enabled to rotate at another predetermined rotating speed (step S21'). The subsequent implementation flow can similarly enter the steps S22 to S24.

Figure 7A:
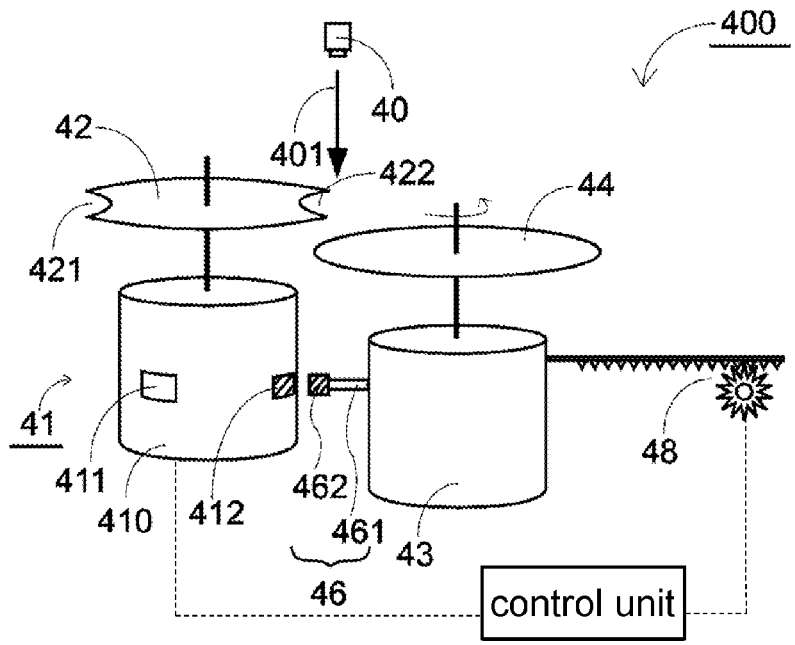
FIGS. 7A and 7B are schematic views showing an inner structure of a projection device 400 with a color wheel locking function according to the invention.
Figure 7B:
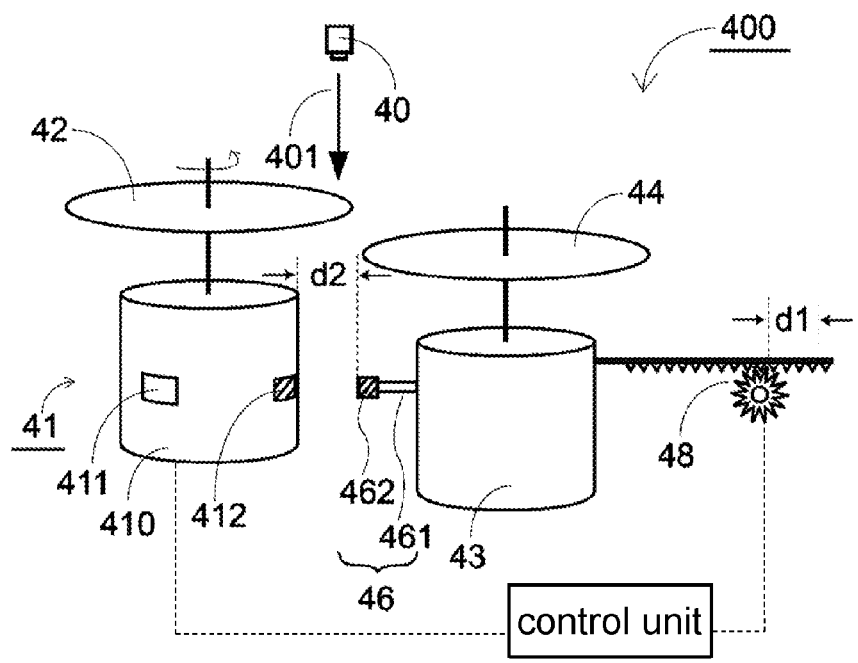

A third embodiment of the invention will be described in the following. FIGS. 7A and 7B are schematic views showing an inner structure of a projection device 400 with a color wheel locking function according to the invention, wherein the similar references relate to the similar elements. In FIGS. 7A and 7B, the projection device 400 further comprises a second color wheel unit 44, a second spindle motor 43 and a transmission mechanism 48. FIG. 7A schematically shows the operation of the second color wheel unit 44, while FIG. 7B schematically shows the operation of a first color wheel unit 42.

The second spindle motor 43 can be enabled (i.e., started) to rotate the second color wheel unit 44, and the transmission mechanism 48 is mechanically coupled to the second spindle motor 43 and a magnetic locking mechanism 46, so that the second color wheel unit 44, the second spindle motor 43 and the magnetic locking mechanism 46 can move integrally. That is, the second color wheel unit 44 and the second spindle motor 43 can move to the positions shown in FIG. 7A or 7B through the transmission. In detail, as shown in FIG. 7A, the second color wheel unit 44 approaches the first color wheel unit 42, but the light beam 401 of the light source 40 can transmit through a transparent region 422 and illuminate the second color wheel unit 44. As shown in FIG. 7B, the second color wheel unit 44 is away from the first color wheel unit 42 to prevent the interference of the light beam 401 when the light beam 401 illuminates the first color wheel unit 42.

In this embodiment, a first spindle motor 41 is similar to the first embodiment, and a first lock magnet unit 412 is disposed on the casing 410, wherein fixed relative positions are present between the first lock magnet unit 412 and the transparent regions 421 and 422. The difference of this embodiment mainly resides in that the magnetic locking mechanism 46 adopts a second lock magnet unit 462 to generate the external magnetic force, and the second lock magnet unit 462 can move. In detail, the magnetic locking mechanism 46 of this embodiment further comprises a fixing frame 461. As shown in FIG. 7A, the fixing frame 461 is mechanically coupled to the second spindle motor 43, and the second lock magnet unit 462 is disposed on the fixing frame 461. In order to generate the mutual attraction, the second lock magnet unit 462 and the first lock magnet unit 412 are disposed with different poles abutting upon each other.

In this embodiment, the second lock magnet unit 462 directly generating the magnetic force is used to replace the electronic magnet designs in the above-mentioned two embodiments. In the projection device with two color wheels, the moving mechanism is essential. So, this embodiment directly utilizes the moving mechanism to make the magnetic force of the magnet unit generate the influence, so that the manufacturing cost can be further saved, and the size of the overall device can be reduced.

In this embodiment, the control unit can drive the transmission mechanism 48 (a stepping motor, a gear and a guiding rod can be adopted to perform the transmission) in correspondence with the disabled state (i.e., stopped state) of the first spindle motor 41, so that the second spindle motor 43 and the magnetic locking mechanism 46 perform the displacement of a first gap d1 and approach the first spindle motor 41 (i.e., move from the position of FIG. 7B leftwards to the position of FIG. 7A). In the schematic view of FIG. 7B, the first spindle motor 41 is enabled to rotate the first color wheel unit 42, and a second gap d2 is present between the first lock magnet unit 412 and the second lock magnet unit 462. The second gap d2 needs to be configured such that the first lock magnet unit 412 and the second lock magnet unit 462 cannot attract each other to move. That is, the first lock magnet unit 412 is disposed outside the affecting range of the external magnetic force generated by the second lock magnet unit 462.

On the other hand, the control unit can drive the transmission mechanism 48 in correspondence with the disabled state (i.e., stopped state) of the second spindle motor 41, so that the second spindle motor 43 and the magnetic locking mechanism 46 perform the displacement of the first gap d1 and move away from the first spindle motor 41 (i.e., move from the position of FIG. 7A rightwards to the position of FIG. 7B), so that the subsequent rotation of the first color wheel unit 42 does not cause interference. In this embodiment, the second gap d2 is configured to be larger than the first gap d1, so that the second lock magnet unit 462 is not attached to the first lock magnet unit 412 but only generates the continuous attraction action in the schematic view of FIG. 7A.

In other words, the external magnetic force of this embodiment is continuously generated, but the affecting range thereof is controlled by way of driving and transmission methods in correspondence with the disabling of the first spindle motor 41. Similarly, the first spindle motor 41 being still rotating is switched from the operating state to the non-operating state (from the schematic view of FIG. 7B to that of FIG. 7A), so the first spindle motor 41 still has a moment of inertia upon being disabled, and can thus continue rotating a plurality of number of turns. Thus, the first lock magnet unit 412 can pass the front of the second lock magnet unit 462 more than once by way of rotation. That is, the first lock magnet unit 412 will slow down the overall rotating speed in correspondence with the continuous attraction of the external magnetic force. When its rotating speed is slowed down to a certain specific value, the first lock magnet unit 412 cannot escape from the external magnetic force and thus stops.

When the first spindle motor 41 stops in correspondence with the external magnetic force, the first lock magnet unit 412 will be aligned with the second lock magnet unit 462, thereby achieving the object of locking the second lock magnet unit 462 at the specified position. According to the design of the relative position, the position of one transparent region 422 corresponds to the light source 40, so that the light beam 401 can transmit through the transparent region 422.

Figure 8:
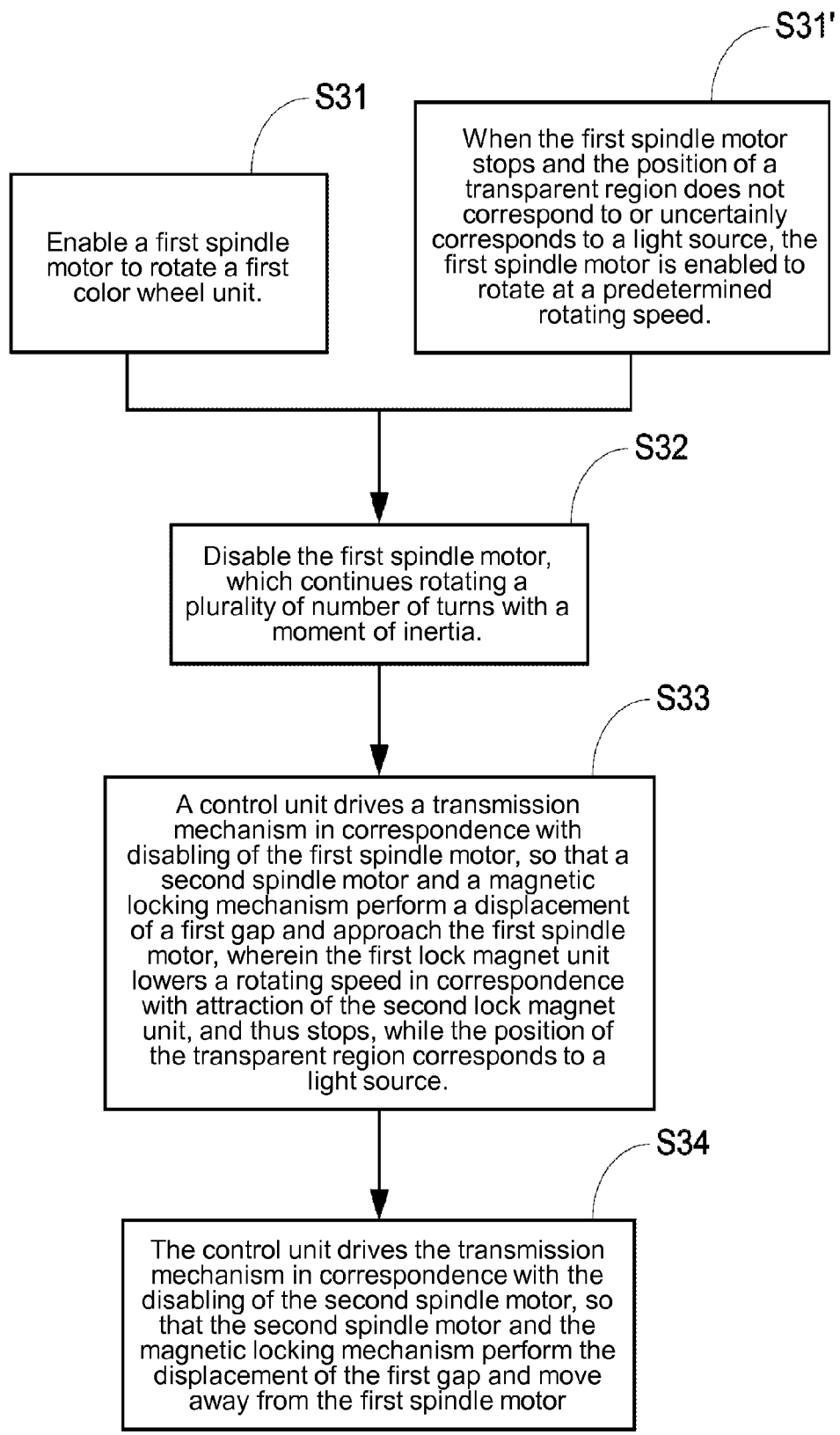
FIG. 8 is an implementation flow chart showing a color wheel locking method according to a third embodiment of the invention.

FIG. 8 is an implementation flow chart showing a color wheel locking method applied to the projection device 400 according to a third embodiment of the invention. First, the first spindle motor 41 is enabled to rotate the first color wheel unit 42 (step S31). Next, the first spindle motor 41 is disabled, and the first spindle motor 41 continues rotating a plurality of number of turns by the moment of inertia (step S32). Then, the control unit drives the transmission mechanism 48 in correspondence with the disabling of the first spindle motor 41, so that the second spindle motor 43 and the magnetic locking mechanism 46 perform the displacement of a first gap d1 and approach the first spindle motor 41. The first lock magnet unit 412 slows down the rotating speed in correspondence with the attraction of the second lock magnet unit 462, and thus stops. Meanwhile, a position of a transparent region 422 corresponds to the light source 40 (step S33).

In addition, if the first spindle motor 41 is to be again enabled to switch to the operating rotating state, then the flow of this embodiment further comprises the following step. The control unit drives the transmission mechanism 48 in correspondence with the disabling of the second spindle motor 43, so that the second spindle motor 43 and the magnetic locking mechanism 46 perform the displacement of the first gap d1 and move away from the first spindle motor 41 (step S34).

Similarly, the third embodiment may also start from another step. That is, when the first spindle motor 41 stops and the position of its transparent region does not correspond to or uncertainly corresponds to the light source 40, the first spindle motor 41 is enabled to rotate at a predetermined rotating speed (step S31'). The subsequent implementation flow can similarly enter the steps S32 to S34.

In summary, for the projection device having two color wheels, the idea of the invention can make each color wheel be moved to be locked to the correct position in the corresponding operation in order to prevent the interference of the projected light beam. In addition, it is also possible to design one set of the color wheel and the motor to move, and the other set is relatively fixed. That is, the invention can effectively save the manufacturing cost and reduce the size of the overall device.

Therefore, the invention can effectively solve the associated problems mentioned in the prior art, and can successfully achieve the main object of this application.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A projection device with a color wheel locking function, the projection device comprising:
   a light source generating a light beam;
   a first color wheel unit having at least one transparent region through which the light beam transmits;
   a first spindle motor to be enabled to rotate the first color wheel unit, and disabled to stop rotating in correspondence with an external magnetic force;
   a magnetic locking mechanism abutting upon the first spindle motor and generating the external magnetic force; and
   a control unit controlling the magnetic locking mechanism;
   wherein when the first spindle motor stops in correspondence with the external magnetic force, a position of the at least one transparent region corresponds to the light source so that the light beam transmits through the at least one transparent region.

2. The projection device according to claim 1, wherein the first spindle motor comprises:
   a casing;
   an indication mark, which is disposed on the casing and indicates a rotating speed and the position of the transparent region; and
   a lock magnet unit disposed on the casing with a magnetic pole, capable of attracting the external magnetic force, facing outwards, wherein fixed relative positions are present between the transparent region and both the indication mark and the lock magnet unit.

3. The projection device according to claim 2, wherein the magnetic locking mechanism generates the external magnetic force by an electronic magnet, a fixed relative position is present between the magnetic locking mechanism and the first spindle motor, and a position of the magnetic locking mechanism corresponds to the lock magnet unit.

4. The projection device according to claim 2, wherein the control unit makes the magnetic locking mechanism generate the external magnetic force in correspondence with disabling of the first spindle motor.

5. The projection device according to claim 4, wherein the first spindle motor has a moment of inertia upon being disabled, and thus continues rotating a plurality of number of turns, and the lock magnet unit lowers the rotating speed in correspondence with attraction of the external magnetic force and thus stops.

6. The projection device according to claim 1, wherein the first spindle motor comprises:
   a casing, which is made of a metallic or paramagnetic material, and has a locking point to be attracted by the external magnetic force; and
   an indication mark, which is disposed on the casing and indicating a rotating speed and the position of the transparent region, and fixed relative positions are present between the transparent region and both the indication mark and the locking point.

7. The projection device according to claim 6, wherein the magnetic locking mechanism generates the external magnetic force by an electronic magnet, and the magnetic locking mechanism comprises:
   a core, wherein a gap is present between the core and the locking point before the external magnetic force is generated, and the core performs a displacement larger than or equal to the gap and is attached to the locking point after the external magnetic force is generated; and
   a spring, which has one end disposed on the core and the other end disposed on a fixing surface, and generates resilient deformation in correspondence with the displacement of the core.

8. The projection device according to claim 6, wherein the first spindle motor has a moment of inertia upon being disabled, and thus continues rotating a plurality of number of turns, and the control unit makes the indication mark detect at least one rotation period of the locking point in correspondence with disabling of the first spindle motor.

9. The projection device according to claim 8, wherein the control unit calculates a predetermined time when the locking point reaching a predetermined rotating speed rotates to a predetermined position according to the rotation period, and makes the magnetic locking mechanism generate the external magnetic force at the predetermined time.

10. The projection device according to claim 9, wherein the predetermined position is disposed in front of the magnetic locking mechanism, and the locking point is attached to the magnetic locking mechanism in correspondence with attraction of the external magnetic force and thus stops.

11. The projection device according to claim 1, wherein the first spindle motor comprises:
    a casing; and
    a first lock magnet unit, which is disposed on the casing and is attracted by the external magnetic force, wherein a fixed relative position is present between the first lock magnet unit and the transparent region.

12. The projection device according to claim 11, wherein the projection device comprises:
    a second color wheel unit to be illuminated by the light beam;
    a second spindle motor to be enabled to rotate the second color wheel unit; and
    a transmission mechanism mechanically coupled to the second spindle motor and the magnetic locking mechanism;
    wherein the control unit drives the transmission mechanism in correspondence with disabling of the first spindle motor so that the second spindle motor and the magnetic locking mechanism perform a displacement of a first gap and approach the first spindle motor; and the control unit drives the transmission mechanism in correspondence with disabling of the second spindle motor, so that the second spindle motor and the magnetic locking mechanism perform the displacement of the first gap and move away from the first spindle motor.

13. The projection device according to claim 12, wherein the magnetic locking mechanism comprises:
    a fixing frame mechanically coupled to the second spindle motor; and
    a second lock magnet unit, which is disposed on the fixing frame and generates the external magnetic force, wherein the second lock magnet unit and the first lock magnet unit are disposed with different poles abutting upon each other;
    wherein when the first spindle motor is enabled, a second gap is present between the first lock magnet unit and the second lock magnet unit such that the first lock magnet unit and the second lock magnet unit do not attract each other, wherein the second gap is larger than the first gap.

14. The projection device according to claim 12, wherein the first spindle motor has a moment of inertia upon being disabled, and thus continues rotating a plurality of number of turns, and the first lock magnet unit lowers a rotating speed in correspondence with attraction of the external magnetic force, and thus stops.

15. The projection device according to claim 1, wherein when the first spindle motor stops and a position of the at least one transparent region does not correspond to or uncertainly corresponds to the light source, the first spindle motor is enabled to rotate at a predetermined rotating speed, and then the first spindle motor is disabled.

16. A color wheel locking method applied to a projection device, the projection device comprising a light source, a first color wheel unit, a first spindle motor, a magnetic locking mechanism and a control unit, the method comprising the steps of:
    enabling the first spindle motor to rotate the first color wheel unit;
    disabling the first spindle motor; and
    enabling the control unit to control the magnetic locking mechanism abutting upon the first spindle motor, so that the first spindle motor stops in correspondence with an external magnetic force generated by the magnetic locking mechanism;
    wherein when the first spindle motor stops in correspondence with the external magnetic force, a position of a transparent region of the first color wheel unit corresponds to the light source, so that a light beam generated by the light source transmits through the transparent region.

17. The method according to claim 16, wherein the first spindle motor comprises a lock magnet unit, and the method further comprises the steps, in which:
    the first spindle motor continues rotating a plurality of number of turns in correspondence with a moment of inertia of the first spindle motor upon being disabled;
    the control unit makes the magnetic locking mechanism generate the external magnetic force in correspondence with disabling of the first spindle motor; and
    the lock magnet unit lowers a rotating speed of the first spindle motor in correspondence with attraction of the external magnetic force, and thus stops.

18. The method according to claim 16, wherein the first spindle motor comprises an indication mark and a locking point made of a metallic or paramagnetic material, and the method further comprises the steps, in which:
    the first spindle motor continues rotating a plurality of number of turns in correspondence with a moment of inertia of the first spindle motor upon being disabled;
    the control unit makes the indication mark detect at least one rotation period of the locking point in correspondence with disabling of the first spindle motor;
    the control unit calculates a predetermined time when the locking point reaching a predetermined rotating speed rotates to a predetermined position according to the rotation period, and makes the magnetic locking mechanism generate the external magnetic force at the predetermined time; and
    the locking point is attached to the magnetic locking mechanism in correspondence with attraction of the external magnetic force, and thus stops;
    wherein the predetermined position is disposed in front of the magnetic locking mechanism.

19. The method according to claim 16, wherein the first spindle motor comprises a first lock magnet unit, the projection device comprises a second spindle motor and a transmission mechanism, the magnetic locking mechanism comprises a second lock magnet unit generating the external magnetic force, the transmission mechanism is mechanically coupled to the second spindle motor and the magnetic locking mechanism, and the method further comprises the steps, in which:
    the first spindle motor continues rotating a plurality of number of turns in correspondence with a moment of inertia of the first spindle motor upon being disabled;
    the control unit drives the transmission mechanism in correspondence with disabling of the first spindle motor, so that the second spindle motor and the magnetic locking mechanism perform a displacement of a first gap and approach the first spindle motor;
    the first lock magnet unit lowers a rotating speed in correspondence with attraction of the second lock magnet unit, and thus stops; and
    the control unit drives the transmission mechanism in correspondence with disabling of the second spindle motor, so that the second spindle motor and the magnetic locking mechanism perform the displacement of the first gap and move away from the first spindle motor.

20. The method according to claim 16, wherein the method further comprises the steps of:
    enabling the first spindle motor to rotate at a predetermined rotating speed when the first spindle motor stops and the position of the transparent region does not correspond to or uncertainly corresponds to the light source; and
    disabling the first spindle motor.

* * * * *